United States Patent [19]

Otsuka et al.

[11] 4,231,232
[45] Nov. 4, 1980

[54] CONSTANT VELOCITY UNIVERSAL JOINT

[75] Inventors: Nobuyuki Otsuka, Kawagoe; Seiichi Hirai, Sayama, both of Japan

[73] Assignee: Honda Giken Kogyo Kabushiki Kaisha, Tokyo, Japan

[21] Appl. No.: 962,800

[22] Filed: Nov. 21, 1978

[30] Foreign Application Priority Data

Dec. 15, 1977 [JP] Japan .......................... 52-167663[U]

[51] Int. Cl.³ .............................................. F16D 3/33
[52] U.S. Cl. .............................................. 64/21; 64/7
[58] Field of Search ........................................ 64/7, 21

[56] References Cited

U.S. PATENT DOCUMENTS

| 3,128,613 | 4/1964 | Faure | 64/21 |
|---|---|---|---|
| 3,324,682 | 7/1967 | Bendler | 64/21 |
| 3,370,441 | 2/1968 | Auctor | 64/21 |
| 3,412,580 | 11/1968 | Cull | 64/21 |
| 3,541,809 | 11/1970 | Howey | 64/21 |
| 3,982,840 | 9/1976 | Grosseau | 64/7 |
| 4,083,201 | 4/1978 | Krude | 64/7 |
| 4,090,375 | 5/1978 | Takahashi | 64/21 |

Primary Examiner—Ira S. Lazarus
Attorney, Agent, or Firm—Haseltine, Lake & Waters

[57] ABSTRACT

A joint of the type in which an outer member and an inner member are each mounted through a ball cage having plural balls mounted in its respective ball windows. The respective balls are in engagement with respective pairs of longitudinally extending ball grooves made in mutually facing surfaces of the respective inner and outer two members, the ball cage is formed at its outer spherical surface with respective longitudinally extending cut-out grooves continuing to the respective ball windows. The respective cut-out grooves are so formed as to have respective contours substantially conforming to respective partition walls between the respective adjacent ball grooves that are formed at the periphery of the mouth of the outer member, so that each partition wall is insertable in each groove.

6 Claims, 7 Drawing Figures

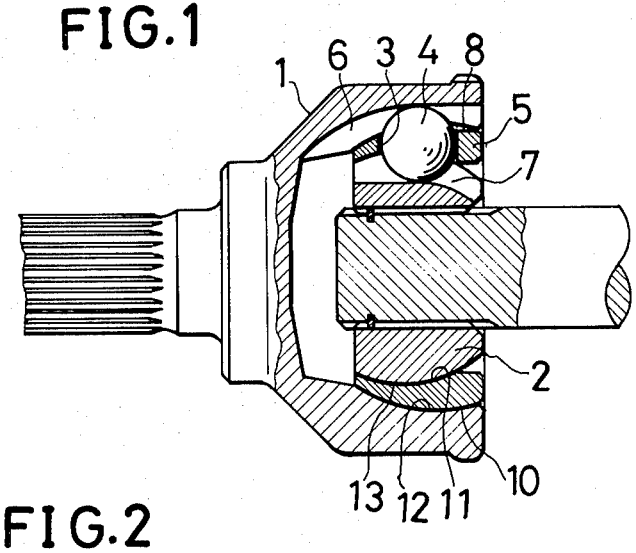
FIG.1
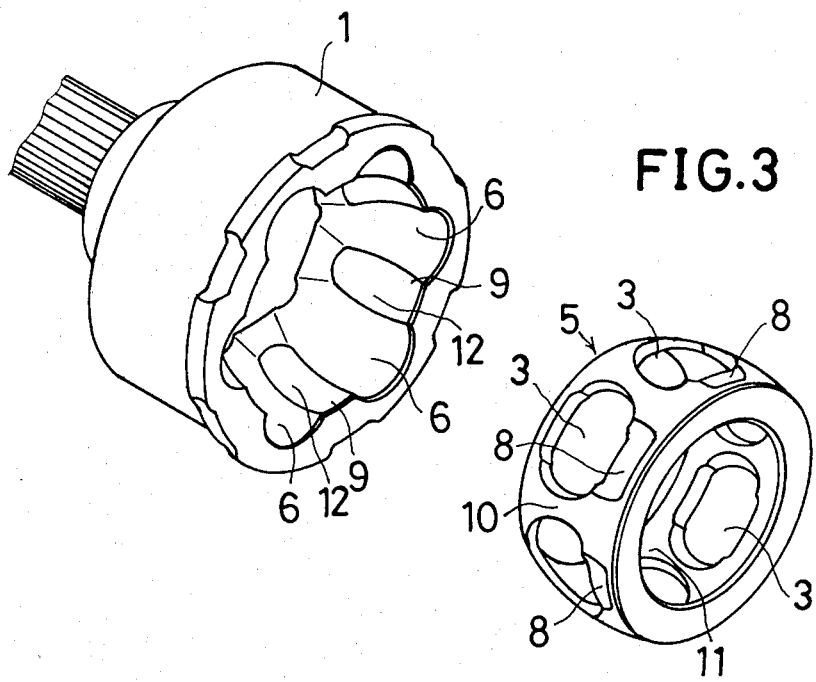
FIG.2
FIG.3

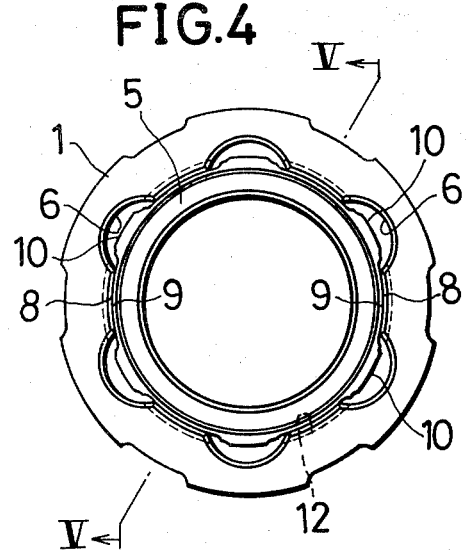
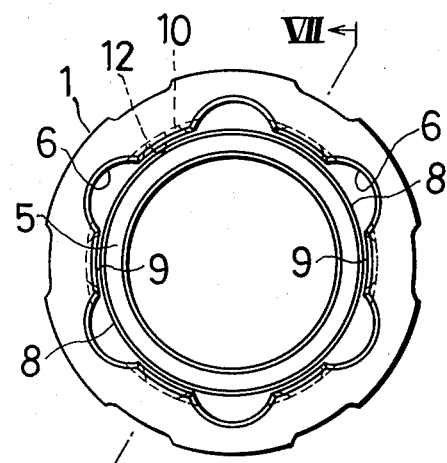
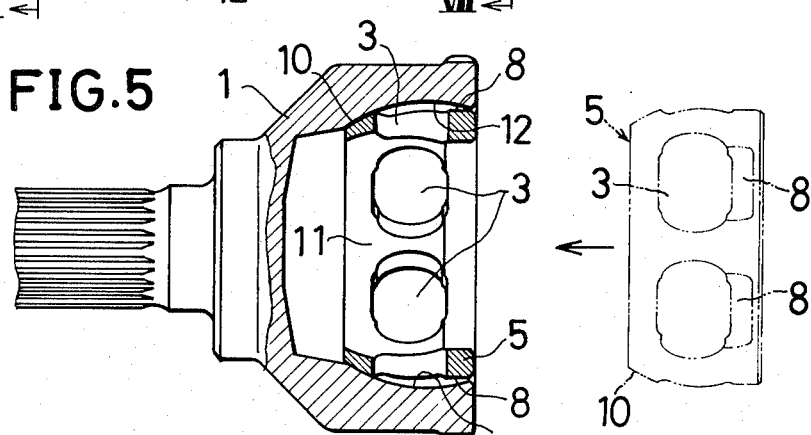
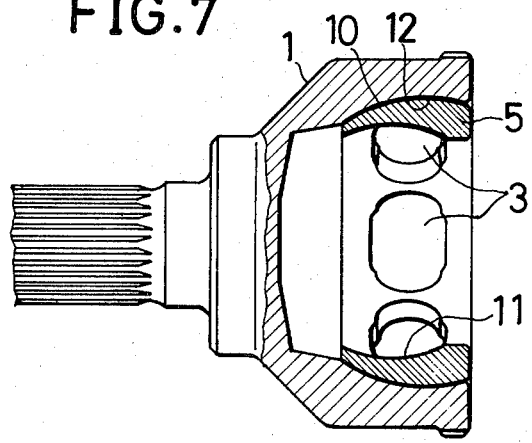

CONSTANT VELOCITY UNIVERSAL JOINT

BACKGROUND OF THE INVENTION

This invention relates to a constant velocity universal joint applicable chiefly to a motorcar or other vehicles.

Hitherto, there has been known a type of joint of this kind in which an outer member and an inner member are mounted on one another through a ball cage having a plurality of balls mounted in respective ball windows. The respective balls are in engagement with respective pairs of longitudinally extending ball grooves made in the mutually facing surfaces of the two members. For this arrangement, the outer member and the ball cage are to be assembled together by being mounted one with another, and the assembling work is simple and easy. For carrying out this assembly, a type of arrangement has been proposed hitherto where the ball cage is formed at its outer surface to form a pair of cut-out portions disposed on the opposite sides thereof. Thus, the cage is mounted through a pair of cut-out portions in the outer member and thereafter the two are turned one with respect to the other so as to be assembled together into such an assembled condition that the two members are prevented from coming apart from each other. However, it has been usual with this type, that the cut-out portions are each comparatively large in size, and thus there are resultant disadvantages that the ball casing is liable to become unbalanced as a whole in strength and is liable to be distorted when subjected to heat treatment.

SUMMARY OF INVENTION

This invention has for its main object to provide a joint free from the prior art disadvantages. According to the invention, a joint of the type is provided in which an outer member and an inner member are each mounted through a ball cage having plural balls mounted in its respective ball windows. The respective balls are in engagement with respective pairs of longitudinally extending ball grooves made in mutually facing surfaces of the respective inner and outer two members, the ball cage is formed at its outer spherical surface with respective longitudinally extending cut-out grooves continuing in relation to the respective ball windows. The respective cut-out grooves are so formed as to have respective contours substantially conforming to respective partition walls between the respective adjacent ball grooves that are formed at the periphery of the mouth of the outer member, so that each partition wall is insertable in each groove.

In the illustrated embodiment, six of the balls are used, and thus six of the ball windows are arranged circumferentially at regular intervals and six of the cut-out grooves are formed.

Additionally, the ball cage is in such a double offset type that the same has its outer diameter spherical surface and its inner diameter spherical surface, eccentric to one another, and the same is in surface contact at its respective spherical surfaces with an inner diameter spherical surface of the outer member and an outer diameter spherical surface of the inner member. These are also eccentric one to another.

The invention will be best understood with respect to the accompanying specification, claims and drawings.

IN THE DRAWINGS

FIG. 1 is a sectional side view of one example of the inventive joint:

FIG. 2 is a perspective view of an outer member thereof:

FIG. 3 is a perspective view of a ball cage thereof:

FIG. 4 is a front view showing the manner of assembling the outer member and the ball casing, FIG. 5 is a sectional view taken along V—V in FIG. 4, FIG. 6 is a front view showing an assembled condition and, FIG. 7 is a sectional view taken along VI—VI in FIG. 6.

DESCRIPTION OF INVENTION

According to the Figures, for assembling the outer member 1 and the ball cage 5, the two members 1, 5 are disposed to face one another. In this case, the respective partition walls 9 and the respective cut-out grooves 8 are disposed to be in alignment with each other. If, under this condition, the two members 1, 5 are advanced to each other, they can be mounted one within the other as shown in FIGS. 4 and 5. If, accordingly, the two members 1, 5 are then relatively turned by a half pitch, they become engaged one with the other in such a condition that they are prevented from coming apart from each other, as shown in FIGS. 6 and 7, and thus an assembled condition is obtained.

Thus, according to the invention, the assembling of the outer member 1 and the ball cage 5 can be effected simply and easily, and because the respective cut-out grooves 8 are made so as to continue with respect to the respective ball windows 3, the same may be sufficient with comparatively shallow depth. Additionally they may be disposed circumferentially at regular intervals, and thus the ball cage as a whole can be prevented from becoming unbalanced in strength and can be free from being given any distortion in the course of heat treatment.

BEST MODE

The joint has an outer member 1 and an inner member 2 each mounted through a ball cage 5 having a plurality of balls 4 disposed ball windows 3. The balls are disposed within ball grooves 6, 7 in mutually facing surfaces 12,13 of members 1, 2. The ball cage 5 is formed with cut-out grooves 8 which continue with respect to the ball windows 3. These grooves 8 are formed with contours substantially conforming to partition walls between adjacent ball grooves 6 at the mouth periphery of outer member 1. The ball cage 5 has an outer spherical surface 10 and an inner spherical surface 11 which respectively ride on the surfaces 12 and 13 of the outer and inner members.

Many modifications and variations of the present invention are possible in light of the above teachings. It is, therefore, to be understood that within the scope of the appended claims, the invention may be practiced otherwise than as particularly described.

We claim:

1. An improved constant velocity universal joint having an outer member and an inner member each mounted through a ball cage having a plurality of balls mounted in respective ball windows, said balls being in engagement with respective pairs of longitudinally extending ball grooves formed in mutually facing spherical surfaces of the respective inner and outer members, said ball cage having front and rear edges and being inserted front edge first into said outer member, the improvement wherein the ball cage has an outer spherical surface in contact with the spherical inner surface of the outer member and is provided with respective longitudinally extending cut-out grooves continuing from each of the respective ball windows, said cut-out grooves being relatively small in size with contours substantially conforming to respective partition walls disposed between respective adjacent ball grooves in said outer member, said ball windows having front and rear edge portions, said cut-out grooves each being provided only at one said rear edge portion of each of said ball windows and extending longitudinally towards the rear edge of said ball cage, and each partition wall of the outer member is insertable in each cut-out groove.

2. An improved universal joint as claimed in claim 1, wherein: said ball cage has an outer diametrical surface and an inner diametrical surface eccentric to one another.

3. An improved universal joint as claimed in claim 1, wherein: six balls are used with an equal number of ball windows disposed circumferentially at regular intervals with six cut-out grooves.

4. An improved universal joint as claimed in claim 1 wherein said cut-out grooves each have a circumferential width less than the width of the respective ball windows.

5. An improved universal joint as claimed in claim 4 wherein said cut-out grooves are relatively small in depth compared to the thickness of said ball cage.

6. An improved universal joint as claimed in claim 5 wherein the cut-out grooves have widths respectively confined within the width of said windows.

* * * * *